2,770,607

RESINOUS PRODUCTS CONTAINING FREE HYDROXYL RADICALS PREPARED BY POLYMERIZING ACRYLONITRILE IN ADMIXTURE WITH AN INTERPOLYMER OF AN ALKENOL AND ANOTHER UNSATURATED MONOMER

Hugh J. Hagemeyer, Jr., and Elizabeth L. Oglesby, Kingsport, Tenn., assignors to Eastman Kodak Company, Rochester, N. Y., a corporation of New Jersey No Drawing. Application April 1, 1952,
Serial No. 279,912

14 Claims. (Cl. 260—30.2)

This invention relates to composite resinous compositions comprising acrylonitrile which has been polymerized in the presence of an interpolymer of an alkenol and another ethylenically unsaturated compound other than an alkenyl alkanoate in a manner such that the resulting compositions contain at least a small amount of free hydroxyl radicals. These composite resinous compositions can be spun into fibers which have improved dyeing characteristics, moisture absorption and other improved properties without impairment of other inherently desirable physical properties such as sticking temperature, etc.

Acrylonitrile has previously been used in the preparation of various polymers which are characterized by insolubility, or very low solubility, in many of the usual organic solvents. Many of these polymers, especially those containing high percentages of acrylonitrile, are further characterized by their lack of susceptibility to organic dyes, it being well known that fibers spun from polyacrylonitrile solutions can be passed through dye baths without material amounts of the dye adhering to the fiber.

Attempts have been made to increase the dyeability of polyacrylonitrile fibers by interpolymerizing acrylonitrile with certain monomers whose polymers have an affinity for dyes. While this procedure does give polymer products from which fibers having good dyeing properties can be obtained, a serious drawback arises in certain instances due to a substantial lowering of the softening point of the fiber. For example, while an interpolymer of acrylonitrile and vinyl acetate containing about 80 percent by weight of acrylonitrile and 20 percent by weight of vinyl acetate in the polymer molecule, can be drawn into fibers readily susceptible to dyes, the softening point of such fibers is too low for practical purposes, softening of the fibers being observed at about 150°–170° C.

Other attempts have been made to increase the dyeability of polyacrylonitrile fibers by mixing with the polyacrylonitrile, before spinning, other polymeric materials which are dye-suscepticle. This procedure likewise provides fibers having good dyeing properties, however, many of these fibers show a low softening point, and in addition many show segmentation into their individual components along their horizontal axis. For example, it can be demonstrated that mixtures of polyvinyl acetate and polyacrylonitrile, when dissolved in either N,N-dimethylformamide or N,N-dimethylacetamide in proportions varying from 15 to 50 percent by weight of polyvinyl acetate based on the total weight of the mixed polyacrylonitrile and polyvinyl acetate, form grainy dopes which separate into two liquid layers on standing. This is also true of many other polymeric compounds, natural or synthetic, which are soluble in the above solvents. Fibers which form from these non-homogeneous solutions or mixtures of polyacrylonitrile and polyvinyl acetate are too low in softening temperature to be of practical value, and also are subject to the defect of segmentation. This is not surprising because of the non-homogeneous condition of the spinning solution and the fact that it is generally known that polyacrylonitrile is not compatible with many organic substances.

Whereas the mixtures of polyacrylonitrile and polyvinyl acetate mentioned immediately above provide solutions which are heterogeneous and separate into layers on standing (and from which fibers showing segmentation are obtained), and the simple interpolymers of acrylonitrile and vinyl acetate soften at too low temperatures to be of use in the preparation of fibers, we have found that certain composite, resinous compositions form stable solutions which do not separate into distinct layers on standing, and from which fibers readily susceptible to dyeing and of homogeneous distribution can be spun. These fibers are characterized by their homogeneity and their susceptibility to organic dyes.

It is, therefore, an object of our invention to provide composite, resinous compositions comprising acrylonitrile which has been polymerized in the presence of an interpolymer of an alkenol and another ethylenically unsaturated compound other than an alkenyl alkanoate. Another object is to provide methods for making such compositions. Still another object is to provide homogeneous solutions of these composite resinous compositions, and fibers prepared from these solutions. Other objects are apparent from a consideration of this specification in its entirety.

According to our invention a process is provided for preparing a composite resinous composition comprising polymerizing from about $\frac{3}{5}$ to $\frac{5}{6}$ part by weight of acrylonitrile in admixture with from $\frac{1}{6}$ to about $\frac{2}{5}$ part by weight of an interpolymer containing at least 2% by weight of free hydroxyl radicals derived from an interpolymerized alkenol selected from the group consisting of isopropenyl and vinyl alcohols and containing at least a second constituent consisting of a different interpolymerized mono-ethylenically unsaturated compound containing a —CH=C< group which does not contain an acyloxy substituent.

The first component of the interpolymer is an alkenol which can be derived from an alkenyl alkanoate, e. g. vinyl acetate, isopropenyl acetate, etc.

It is known that small amounts of partially hydrolyzed polyvinyl acetate can be used as granulating agents in the polymerization of acrylonitrile (U. S. Patent 2,354,-210, dated July 25, 1944, U. S. Patent 2,404,817, dated July 30, 1946, etc.). The partially hydrolyzed polyvinyl acetate used for this purpose is water soluble, or can be leached from the polymer products by washing. Moreover, the amounts of the hydrolyzed ester used are quite small, and have little effect on the dyeing properties of fibers prepared from these polymers.

While the hydrolyzed polyvinyl acetate used in the granular polymerization of acrylonitrile is removed in the processing of the polymer, this is not true when hydrolyzed polyvinyl acetate is used in our invention, the hydrolyzed polyvinyl acetate actually following through into the polymer products to such an extent that fibers prepared therefrom can be readily dyed with acetate, direct, vat, etc. dyes. An inner equilibrium appears to be set up in the new polymer compositions of our invention, between the hydrolyzed polyvinyl acetate and the interpolymerized acrylonitrile, since the polymer compositions assume the character of a unary system, or a one component system. The polymer compositions of our invention act somewhat like solid solutions, since they are not affected by solvent extraction techniques and they cannot be mechanically broken down into their component parts. Spectrographic studies of our polymer compositions seem to indicate that in addition to interpolymerization of the acrylonitrile, some cyanoethylation of the hydrolyzed polyvinyl acetate and imino-ether formation between the nitrile groups of the polymer and the hydroxyl groups of the hydrolyzed polyvinyl acetate take place. Present studies have not revealed the theoretical basis for the phenomena exhibited by the polymer compositions of our invention. That the polymer compositions of our invention are not simple mixtures can be shown by dissolving the compositions in solvents known to have a high dissolving power for polymers of acrylonitrile, such as N,N-dimethylformamide or N,N-dimethylacetamide. The solutions thus obtained are clear and homogeneous, whereas those solutions prepared by dissolving an interpolymer of acrylonitrile in the solvent, followed by addition of the hydrolyzed polyvinyl acetate, are not clear but are cloudy in appearance, which indicates the hydrolyzed polyvinyl acetate did not completely dissolve. Moreover, the solutions prepared from the polymer compositions of our invention do not separate into distinct layers on standing, while those prepared by adding acrylonitrile polymers and hydrolyzed polyvinyl acetate separately to the solvent, e. g. N,N-dimethylacetamide, separate into distinct layers.

In preparing a composite resinous composition according to our invention, the first constituent of the interpolymer is advantageously an alkenol such as vinyl alcohol or isopropenyl alcohol which can be derived from a lower alkanoic acid ester thereof by hydrolysis or alcoholysis. The second constituent is a different interpolymerized mono-ethylenically unsaturated compound containing a —CH=C< group or a CH$_2$=C< group which does not contain an acyloxy substituent. Examples include methyl acrylate, ethyl acrylate, n-propyl acrylate, isopropyl acrylate, n-butyl acrylate, isobutyl acrylate, methyl methacrylate, ethyl methacrylate, n-propyl methacrylate, isopropyl methacrylate, n-butyl methacrylate, isobutyl methacrylate, methacrylonitrile, acrylamide, N-methacrylamide, N,N-dimethylacrylamide, N-isopropylacrylamide, N-butylacrylamide, methacrylamide, N-methylmethacrylamide, N,N-dimethylmethacrylamide, N-isopropylmethacrylamide, methyl vinyl ketone, isopropenyl methyl ketone, methyl vinyl ether, acrylic acid, methacrylic acid, vinyl chloride, vinylidene chloride, styrene, ethylene, propylene, vinyl carbazole, vinylpyridine, vinylpyrrolidone, ethylene α, β-dicarboxylic acids, their nitriles, amides, or esters (e. g. N,N'-diethylfumaramide, diisopropyl fumarate, dimethyl maleate, diethylmaleate, diethyl itaconate, N,N'-dimethylitaconamide, etc.), α-acetoxy-acrylonitrile, alkenyl alkanoate-maleic anhydride ester lactones such as isopropenyl acetate-maleic anyhdride ester lactones, vinyl cyanoethyl formal, etc. and acrylonitrile.

The examples which follow set forth preferred compounds of this type.

The formation of the interpolymer by polymerization of the components thereof in admixture or by any other suitable means can be accomplished in accordance with procedures well known in the art. The same is true for the polymerization of acrylonitrile in admixture with such interpolymers whereby the desired composite resinous composition is formed. The term polymerization can be applied to both of these procedures. In preparing the interpolymer, other means besides simple polymerization can also be employed as set forth in the examples hereinbelow.

The polymerization can be accelerated with heat, and temperatures of from 40°–70° C. have been found to be especially useful, although higher or lower temperatures can be used, if desired.

The polymerization can be further accelerated by adding at least one of the catalysts known to accelerate the polymerization of vinyl compounds. Typical catalysts include the organic and inorganic peroxide polymerization catalysts, such as hydrogen peroxide, persulfates (e. g. the alkali metal persulfates, such as sodium, potassium, etc. persulfates, and ammonium persulfates), perborates (e. g. the alkali metal perborates, such as sodium, potassium, etc. perborates, and ammonium perborate), percarbonates (e. g. the alkali metal percarbonates, such as sodium, potassium, etc. percarbonates), ozone, peracetic acid, triacetone peroxide, urea peroxide, acetyl peroxide, benzoyl peroxide, acetyl benzoyl peroxide, lauroyl peroxide, oleoyl peroxide, etc. Other polymerization catalysts, such as triethyl phosphite, organic azines, etc. can also be used to increase the speed of polymerization. The quantity of catalyst used can be varied, however, we have found that from 0.01 percent to 2 percent by weight, based on the weight of acrylonitrile, or other monomers, can be used to advantage.

Advantageously, the polymerization can be effected with or without a diluent. Polymerization is an aqueous medium has been found to be especially useful, in that it is thus possible to use more conveniently many of the water-soluble polymerization catalysts, such as the persulfates. An organic solvent miscible with water can be added to the aqueous medium and the polymerization carried out in solution. or an emulsifying agent can be added to the aqueous medium, and the polymerization carried out in an emulsion.

For solution polymerization, an aqueous acetone solution can be used to give especially advantageous results, although other solvents, such as ethanol, n-propanol, isopropanol, etc. can be used. Aqueous acetone solutions containing from 30 to 70 percent by volume of water and from 70 to 30 percent by weight of acetone are representative of the solutions which can be used.

Typical emulsifying agents which we can use in emulsion polymerizations include the alkali metal salts of fatty alcohol sulfates (e. g. sodium lauryl sulfate, etc.), alkali metal salts of aromatic sulfonic acids (e. g. sodium isobutylnaphthalenesulfonate, etc.), sulfosuccinic acid esters, their alkali metal salts or amine addition salts, alkali metal salts of fatty acids containing from 12 to 20 carbon atoms, sulfonated fatty acid amides or their alkali metal salts, the complex reaction products obtained by reacting ethylene oxide with aliphatic alcohols and amines, polyvinyl alcohol polymers, etc.

When preparing an interpolymer of acrylonitrile in the presence of a polymer containing hydroxyl groups, it is sometimes advantageous to heat the acrylonitrile and the interpolymer for a short time before adding the polymeriaztion catalyst. This increases the amount of cyanoethylation, and increases the compatibility and homogeneity of the final products. After as much cyanoethylation has occured as is desired, the polymerization catalyst can be added and heating continued until the polymerization is substantially complete.

Hydrolyzed polyvinyl acetates having a molecular weight within the range of 25,000 to 300,000 can be used, although weights of from 40,000 to 200,000 have been found to be especially useful. The composite polymer products formed in our invention having a molecular weight of from about 40,000 to 200,000 have been found to be especially useful as fiber precursors.

The pH of the polymerization medium can be varied from about 3 to 10, although a pH of from 4 to 7 has given especially useful results. Acids, such as orthophosphoric acid, ethanesulfonic acid, oxalic acid, can be added to the polymerization medium, if desired. The air above the polymerization medium can be replaced with an inert gas, such as nitrogen, carbon dioxide, etc. prior to polymerization.

When the polymerization is nearly complete as evidenced by a drop in reaction heat, we have found that it is generally convenient to maintain the reaction temperature for an additional period of time to complete the polymerization. Any unreacted monomer is then distilled off under normal or reduced pressures. The reaction mixture contains from about 20 to 40 percent solids, which are filtered off, or in the event the polymer products are obtained in the form of an emulsion, the emulsion is first broken by heating with a 1 to 2 percent solution of sodium chloride, or aluminum sulfate, and the products then filtered off. After washing the polymers with water, they are dried in warm air at 60–80° C. The drying can be accelerated by using a low boiling solvent in the final washing steps. The polymer products obtained in our invention having a molecular weight of from about 40,000 to 200,000 have been found to be of special utility.

The composite resinous compositions of this invention can be dissolved in such solvents as N,N'-dimethylformamide, and N,N'-dimethylacetamide; other solvents which have been found to be especially useful include ethylene carbamate, ethylene carbonate, N-methyl-2-pyrrolidone and γ-butyrolactone.

Still other solvents which can be used in the preparation of solutions from our new compositions include N,N - dimethylmethoxyacetamide, dimethylcyanamide, N,N-dimethylcyanoacetamide, N,N-dimethyl-β-cyanopropionamide, glycolonitrile (formaldehyde cyanohydrin), malonitrile, ethylenecyanohydrin, dimethylsulfoxide, N-formylpyrrolidine, N-formylmorpholine, N,N' - tetramethylmethanephosphonamide, etc. Generally speaking, these solvents are not as advantageous as the solvents referred to above.

These composite resinous compositions can be formed into sheets, films, etc. in addition to being employed in the preparation of fibers. Details as to how fibers can be advantageously formed are obvious to those skilled in the art and are discussed to some extent in the examples given hereinbelow.

The manner of practicing our invention can be illustrated by the following seven subdivisions of exemplary material which cover numerous working examples.

I. OLEFIN OR STYRENE-ALKENOL INTERPOLYMERS

This aspect of the invention covers a process for preparing a composite resinous composition comprising polymerizing from about ⅗ to ⅚ part by weight of acrylonitrile in admixture with from ⅕ to about ⅖ part by weight of an interpolymer containing from about 3% to about 20% by weight of free hydroxyl radicals derived from an interpolymerized alkenol selected from the group consisting of isopropenyl and vinyl alcohols and containing at least one additional constituent consisting of from about 2 to about 90% by weight of the interpolymer of an interpolymerized ethylenically unsaturated compound (EUC) selected from the group consisting of ethylene, propylene, and styrene.

These composite resinous compositions can be depicted as follows:

$$(EUC)_X(alkenol)_Y$$

wherein the subscript represents the proportions by weight. When the alkenol is associated with or derived from a lower alkanoic ester thereof these compositions can be depicted thusly:

$$(EUC)_X(alkenol)_Y(alkenyl\ alkanoate)_Z$$

The following example illustrates the employment of an interpolymer of ethylene, vinyl alcohol and vinyl acetate where the alcohol is derived from the acetate.

*Example 1.—Olefin or styrene, vinyl alcohol-vinyl ester interpolymers*

These interpolymers can be depicted as follows:

$$(C_2H_4)_X(C_2H_3OH)_Y(C_2H_3OR)_Z$$

wherein R is a lower acyl radical, Y/Z is at least 1/5, X is from about 2 to about 90, and Y+Z is from about 98 to about 2. Propylene, styrene, etc., can be substituted for ethylene as the ethylenically unsaturated compound (EUC). An interpolymer of this type was prepared from an ethylene-vinyl acetate interpolymer by means of partial hydrolysis whereby an interpolymer was formed which had the composition:

$$(C_2H_4)_{23}(C_2H_3OH)_{31}(C_2H_3OAc)_{46}$$

The preparation of such an interpolymer is readily accomplished according to procedures well known in the art. Twenty grams of this interpolymer was dissolved in 80 grams of acrylonitrile and the mixture was added to a stirred solution of 350 ml. of water containing 0.5 g. of ammonium persulfate, 1.0 gram of sodium bisulfite and 0.25 gram of tertiary dodecyl mercaptan. After purging with N₂ the polymeriation started and was held at 40–45° C. by cooling for two hours. The polymeriaztion was finished by heating at 55° C. for one hour. A 92% yield of a composite resinous composition was obtained. This was a white powder which was dissolved to form a 15.8% dope in dimethyl formamide which was wet and dry spun, and oriented by a hot draft to form fibers having these properties: A strength of 3 to 5 grams per denier, i. e., g./d. was 3–5; an elongation of 12 to 17%, i. e., E. was 12–17%, and an excellent affinity for acetate dyes.

Other composite resinous compositions were prepared wherein acrylonitrile was polymerized in admixture with similar proportions of other interpolymers of the type just described. Such compositions have been found to have properties similar to those just described. Thus, propylene, styrene, etc. can be employed in place of the ethylene in the above example.

II. VINYL CHLORIDE-ALKENOL INTERPOLYMERS

This aspect of the invention covers a process which produces a product similar to that described in I as set forth in Example 1 above, except that the ethylenically unsaturated compound (EUC) is replaced with vinyl chloride. Such an interpolymer can be depicted as follows:

$$(vinyl\ chloride)_X(alkenol)_Y$$

When the alkenol is associated with or derived from a lower alkanoic ester thereof these interpolymers can be depicted thusly:

$$(vinyl\ chloride)_X(alkenol)_Y(alkenyl\ alkanoate)_Z$$

The following example illustrates the employment of an interpolymer of vinyl chloride and vinyl alcohol.

*Example 2.—Vinyl chloride-vinyl alcohol interpolymer*

A 75/25 (ratio by weight) vinyl chloride-vinyl acetate interpolymer was dissolved in methanol containing 0.25% H₂SO₄. Methyl acetate was stripped off through a short Vigreaux column. The interpolymer was precipitated in water and air dried. It had an analysis indicating the following composition:

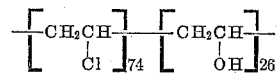

25 grams of the vinyl chloride-vinyl alcohol interpolymer was dispersed in 500 ml. of water containing 0.5 g. ammonium persulfate, 1 gram sodium bisulfite and 5 drops of tertiary dodecyl mercaptan. After deaeration with N₂, 75 grams of acrylonitrile was added and polymerization began immediately. The exothermic reaction was controlled by cooling whereby a temperature of 45–53° C. was maintained for 2½ hours. The smooth, white composite resinous composition filtered easily and weighed 92 grams. Fibers spun from at 13.2% dope in dimethyl formamide had the properties: g./d. was 3.7, E. was 16%, and the fibers had a fair affinity for acetate and direct dyes.

Isopropenyl acetate-vinyl chloride copolymers also undergo methanolysis and can be employed as modifiers of this type.

The methanolysis of such interpolymers need not be carried to completion. The interpolymer can be advantageously made up of a ratio of X from 10 to 35 and of Y from 90 to 65 parts by weight. The parts of Y can include some ester.

III. ACRYLONITRILE-ALKENOL INTERPOLYMERS

This aspect of the invention covers a process which produces a product similar to that described in I as set forth in Example 1 above, except that the olefin or styrene is replaced with acrylonitrile. Such an interpolymer can be depicted as follows:

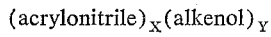
(acrylonitrile)$_X$(alkenol)$_Y$

When the alkenol is associated with or derived from a lower alkanoic ester thereof these interpolymers can be depicted thusly:

(acrylonitrile)$_X$(alkenol)$_Y$(alkenyl alkanoate)$_Z$

The following example illustrates the employment of an interpolymer of acrylonitrile, vinyl alcohol and vinyl acetate as a modifier in preparing a polyacrylonitrile composite resinous composition:

*Example 3.—Acrylonitrile-alkenol-alkenyl alkanoate interpolymers*

Acrylonitrile and isopropenyl acetate were interpolymerized in ratios varying from 30/70 to 90/10 parts by weight thereof. The resulting interpolymer was dissolved in a suitable solvent and subjected to alcoholysis in the presence of a suitable catalyst. The same type of interpolymer was also prepared employing vinyl acetate. As a specific example, 55 grams of acrylonitrile and 45 grams of vinyl acetate were polymerized in an aqueous dispersion of 350 ml. of water containing 0.5 grams of ammonium persulfate, 1 gram of sodium bisulfite and 0.25 gram of tertiary dodecyl mercaptan. After washing and drying the acrylonitrile-vinyl acetate interpolymer was dissolved in a mixture of acetone and methanol containing 0.05 percent H$_1$SO$_4$ and heated. The acrylonitrile-vinyl alcohol interpolymer separated out as formed to give the following composition:

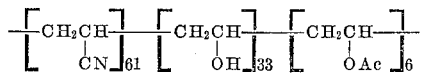

Seventy grams of acrylonitrile was polymerized, as in Example 2, with 30 grams of the above interpolymer. The resulting composite resinous composition was obtained in 89 per cent yield and formed 14 per cent dope in dimethyl formamide. Multifilament fibers were spun which had the properties: G./d. was 4.8, E. was 16%, and they had excellent affinity for acetate and direct cotton dyes.

Twenty-seven grams of the above interpolymer was dispersed in 500 ml. of water containing 0.5 g. ammonium persulfate, 1 gram of sodium bisulfite and 10 drops of tert. dodecyl mercaptan. Sixty-seven grams of acrylonitrile and 3 grams of methyl acrylate were added after deaerating with N$_2$ and the polymerization began after an induction period of 5 minutes at a temperature of 50–55° C. which was maintained for two hours by intermittent cooling at first and later by heating. A 97 percent yield of this composite resinous composition was obtained and formed clear, smooth dopes in dimethyl formamide, dimethyl acetamide, methyl pyrrolidone, ethylene carbonate, and gamma butyrolactone. Multi-filament fibers of this composition had the properties: G./d. was 4.53, E. was 22%, and they had excellent affinities for acetate and direct cotton dyes.

IV. VINYL CYANOETHYL FORMAL-ALKENOL INTERPOLYMERS

This aspect of the invention covers a process which produces a product similar to that described in I as set forth in Example 1 above except that the olefin is replaced with an alkenyl cyanoethyl formal, e. g. vinyl cyanoethyl formal. These composite resinous compositions can be depicted as follows:

(alkenyl cyanoethyl formal)$_X$(alkenol)$_Y$ and when the alkenyl substituents are vinyl, they can be depicted thusly:

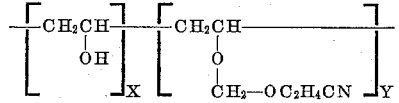

Such an interpolymer can be prepared as illustrated by the following example:

*Example 4.—Vinyl cyanoethyl formal-vinyl alcohol interpolymer*

A 54% cyanoethyl formal-polyvinyl alcohol composition was prepared by reacting low viscosity polyvinyl alcohol, formaldehyde and acrylonitrile in a water solution in the presence of sodium hydroxide as the catalyst. The resulting interpolymer analyzed as follows:

(vinyl cyanoethyl formal)$_{54}$(vinyl alcohol)$_{46}$ 80 parts of acrylonitrile was polymerized in admixture with 20 parts of this interpolymer in accordance with procedures given hereinabove and the composite resinous composition obtained had advantageous properties analogous to those described above for the other compositions.

Cyanoethylated polyvinyl alcohols containing from 10–90 percent cyanoethyl groups have been similarly prepared and advantageously used as modifiers for polyacrylonitrile, i. e., the value of X was from 10 to 90 and Y was from 90 to 10 parts by weight. When X is 10, then the percentage of free hydroxyl in this interpolymer is about 3%.

Referring back to III above, mixtures of the acrylonitrile-vinyl alcohol and acrylonitrile-isopropenyl alcohol interpolymers similar to those of Example 3 have been employed to prepare composite resinous compositions when acrylonitrile or a mixture of acrylonitrile and isopropenyl acetate was polymerized in admixture therewith. The resultant compositions were characterized by unusual compatability and the interpolymer modifier present therein exhibited no tendency to separate during spinning, dyeing and repeated washing in strong soaps and detergents. Such products are also relatively cheap and easy to prepare. Typical fiber properties which have been obtained are: G./d. was 3.5 to 6.0; E. was 16 to 30% and they exhibited excellent acetate dye and direct cotton dye affinities.

V. MALEIC ESTER LACTONE-ALKENOL INTERPOLYMERS

This aspect of the invention covers a process which produces a product similar to that described in I as set forth in Example 1 above, i. e. a process for preparing a composite resinous composition comprising polymerizing from about ⅗ to ⅚ part by weight of acrylonitrile in admixture with from ⅙ to about ⅖ part by weight of an interpolymer containing from at least 2% to about 40% by weight thereof of free hydroxyl radicals derived from one mol proportion of an interpolymerized alkenol selected from the group consisting of isopropenyl and vinyl alcohols and containing from about ½ to less than one mol proportion (compared to the mol proportion of alkenol) of at least one additional constituent consisting of maleic anhydride.

These composite resinous compositions can be depicted as follows (maleic ester lactone)$_X$(alkenol)$_Y$ wherein X and Y represent the proportions by weight (Y may become quite small as long as the interpolymer contains at least 2% hydroxyl by weight). When the alkenol is associated with or derived from a lower alkanoic ester thereof these compositions can be depicted thusly:

(maleic ester lactone)$_x$(alkenol)$_y$(alkenyl alkanoate)$_z$

Examples of such interpolymers are set forth in U. S. 2,481,769 and U. S. 2,575,006. The following example illustrates the employment of an interpolymer of maleic ester lactone and isopropenyl alcohol where the alcohol is derived from the acetate.

*Example 5.—Maleic ester lactone-isopropenyl alcohol interpolymer*

An interpolymer of this nature can be depicted as follows:

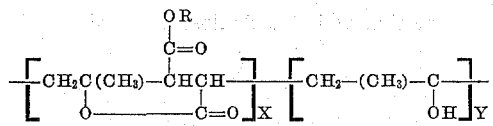

wherein R is a lower acyl radical. Such an interpolymer was prepared by reacting one mol of isopropenyl acetate and one mol of maleic anhydride in the presence of a catalyst such as benzoyl peroxide; the mass polymerization process was used. This condensation polymerization product was then treated with an alcohol using an acid catalyst. The 1 to 1 (mol ratio) interpolymer obtained contained 36% alkoxy, 10.6% acetyl, 8.3% carboxyl as maleic acid, 41.5% lactone and 3.5% OH. This process was repeated using a mol ratio of 2 to 1 of maleic anhydride to isopropenyl acetate; the interpolymer obtained had a hydroxyl content of 34.7%.

Both the 1/1 and 2/1 interpolymers were dissolved in acrylonitrile and the acrylonitrile was polymerized in an aqueous dispersion in an identically analogous manner to that described in Example 1. The composite resinous products which were produced were employed to form clear smooth dopes in dimethyl formamide and gamma butyrolactone and were spun and drafted to form fibers with good acetate dye affinities. The corresponding interpolymers of vinyl alcohol were similarly prepared and were found to have similarly useful properties. In none of these instances is it necessary to remove all of the acyl radical from the alkenol ester by alcoholysis.

VI. MALEIC OR FUMARIC DIESTER-ALKENOL INTERPOLYMERS

This aspect of the invention covers a process which produces a product similar to that described in V as set forth in Example 5 above, except that the maleic derivative is a dialkyl ester. The interpolymers employed in preparing composite resinous compositions of this type can be depicted as follows (dialkyl maleate or fumarate)$_x$(alkenol)$_y$

*Example 6.—Dimethyl maleate—isopropenyl alcohol interpolymer*

An equimolecular interpolymer of isopropenyl acetate and dimethyl maleate was formed by bulk polymerization with benzoyl peroxide catalyst. The polymer was dissolved in acetone and precipitated in water. The dry polymer was dissolved in methanol containing 0.1% ZnCl$_2$ and heated to remove methyl acetate and then precipitated in water and dried. An analysis indicated the following composition:

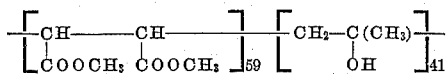

Twenty grams of the above interpolymer was dissolved in 80 grams of acrylonitrile and this solution was added to a stirred aqueous redox system made up of 500 grams H$_2$O, 0.5 gram (NH$_4$)$_2$S$_2$O$_8$, 1 gram NaHSO$_3$, 0.25 gram tert. dodecylmercaptan. The precipitation of the modified polyacrylonitrile composition started at 42° C. and was completed at 55–60° C. A 94 percent yield was obtained. A 14% dope in dimethylformamide was spun into isopropanol giving a bright monofilament which had an excellent affinity for acetate dyes.

Polyvinyl alcohol-dimethyl maleate and polyvinyl alcohol-di-isopropyl fumarate polymers have been prepared wherein the percentage of hydroxyl varied from 10–70%. They can be advantageously used as good modifiers for acrylonitrile and impart excellent acetate dye affinity, i. e., X can be from 10 to 70 and Y can be from 90 to 30 parts by weight. Other esters can be similarly employed.

VII. VINYL LACTATE (GLYCOLLATE)-ALKENOL INTERPOLYMERS

This aspect of the invention covers a process which produces a product in a manner similar to that described in V as set forth in Example 5 above except that the maleic anhydride is replaced with vinyl lactate or vinyl glycollate. These interpolymers can be depicted as follows (see also Example 7):

(vinyl lactate or glycollate)$x$(alkenol)$y$

When the alkenol is associated with or derived from a lower alkanoic ester these compositions can be depicted thusly (see Example 8):

(vinyl lactate or glycollate)$x$ (alkenol)$y$(alkenyl alkanoate)$z$

The interpolymer based on the first arrangement depicted can be illustrated by the following example where vinyl alcohol and vinyl lactate are interpolymerized.

*Example 7.—Vinyl lactate-vinyl alcohol interpolymers*

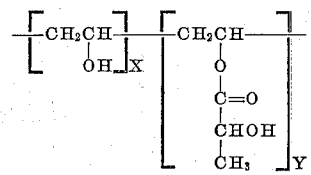

Two forms of polyvinyl alcohol-polyvinyl lactate interpolymers were prepared by direct acetylation of polyvinyl alcohols of low, medium, and high viscosity.

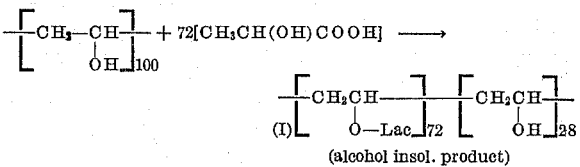

(alcohol insol. product)

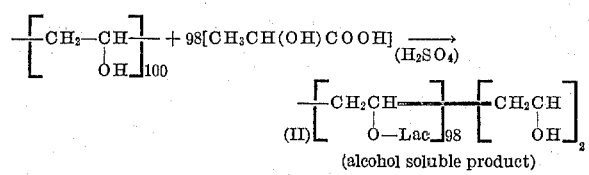

(alcohol soluble product)

As indicated elsewhere hereinabove the figures outside of the bracketed formulas represent weight proportions rather than numbers of molecules.

Emulsion and aqueous polymerization techniques were used to prepare composite resinous compositions with acrylonitrile in an analogous manner to that described hereinbefore. The aqueous method is preferred because the properties of the products are easily duplicated, a relatively pure composite resinous composition is obtained, and the spinning dopes are clear, smooth and gel free. The following tabulation gives the properties of fibers obtained from such resinous compositions:

| Composition | | | | Percent Dope | G./D. | Percent E | Denier |
|---|---|---|---|---|---|---|---|
| Parts AN | Parts IPA | Parts PVL(I) | Parts PVL(II) | | | | |
| 81 | 0 | 19 | 0 | 13.0 | 2.98 | 19 | --- |
| 81 | 0 | 0 | 19 | 16.7 | 3.40 | 16.7 | 174 |
| 54 | 0 | 35 | 0 | 13.5 | 2.15 | 9 | 582 |
| 72 | 10 | 15 | 0 | 16.7 | 3.24 | 24.1 | 269 | where the symbols have these meanings: AN is acrylonitrile, IPA is isopropenyl acetate, PVL (I) is (polyvinyl alcohol)$_{28}$ (polyvinyl lactate)$_{72}$, PVL (II) is (polyvinyl alcohol)$_2$ (polyvinyl lactate)$_{98}$, the dope is a solution in dimethyl formamide, g./d. is strength in grams per denier, E. is elongation, and all parts are by weight.

The interpolymer based on the second arrangement set forth above, can be illustrated by the following example wherein an ester interchange is brought about between methyl lactate and polyvinyl acetate (i. e. lactic acid is reacted with polyvinyl acetate), provision being made for sufficient hydrolysis (or alcoholysis) to provide at least 2% hydroxyl content in the resultant composite resinous product.

*Example 8.—Vinyl lactate-vinyl acetate-vinyl alcohol interpolymers*

Polyvinyl acetate-lactate was made by ester interchange between methyl lactate and polyvinyl acetate (Gelva 100). The polyvinyl acetate was dissolved in excess methyl lactate containing 0.4 percent zinc chloride. While stirring the mixture, methyl acetate was distilled off through a short packed column. Polyvinyl acetate lactate was precipitated in water and dried. This product can be depicted as follows:

Twenty grams of the above polyvinyl acetate-lactate was dissolved in 80 grams of acrylonitrile and slowly added to a stirred solution of 0.5 g. of ammonium persulfate, 1.0 g. sodium bisulfite and 10 drops (0.25 g.) of tertiary dodecyl mercaptan in 350 ml. of water. The polymerization was exothermic with the polyvinyl acetate-lactate-acrylonitrile composition beginning to separate immediately as a fine, white easily filtered powder. A temperature between 40–50° C. was maintained for 1½ hours by cooling. During the course of this reaction a portion designated as Y of free vinyl alcohol units was formed in the composite resinous composition which thereby acquired a free hydroxyl content in excess of about 2% by weight thereof. The product obtained formed a 12.0% dope in dimethyl formamide and multifilament fibers showed an excellent affinity for acetate dyes. Fiber properties included a strength of 3.81 grams per denier, 15.3% elongation and a denier of 224.

Polyvinyl acetate-lactate (vinyl lactate)$_{54}$(vinyl acetate)$_{46}$ was also prepared by heating polyvinyl acetate (Gelva 25) in excess lactic acid at 90° C. for 24 hours and allowing sufficient alcoholysis or hydrolysis to produce a sufficient hydroxyl content prior to the final formation of the modified acrylonitrile product.

In addition to the lactate esters and mixed esters, polyvinyl glycollate and polyvinyl acetate-glycollate have been employed to modify acrylonitrile polymers in a manner analogous to that just described and with advantageous results.

The above examples and discussion make it evident to those skilled in the art that interpolymers which can be employed in accordance with our invention include practically any interpolymer which is susceptible to alcoholysis or hydrolysis of vinyl esters or isopropenyl esters with other ethenoid compounds which contain no acyloxy substituents. Interpolymers which are firm solids at ordinary temperatures both before and after alcoholysis or hydrolysis are preferred. The solubility properties of the resultant interpolymer in water and/or common organic solvents is immaterial. Such interpolymer modifiers used in accordance with this invention should be produced in low or medium viscosities when they contain high percentages of free hydroxyl groups since the high viscosity materials have a tendency to gel and are difficult to dissolve in the common solvents for polyacrylonitrile.

In connection with the disclosure of this application attention is directed to related resinous compositions, etc. covered by applications on file and patents which have issued based on works done in the laboratory with us or in closely associated laboratories, e. g. U. S. 2,571,683, U. S. 2,571,777, U. S. 2,569,470, application Ser. No. 237,686, filed July 19, 1951, etc.

We claim:

1. A process for preparing a composite resinous composition comprising polymerizing, at an elevated temperature in the presence of a peroxide polymerization catalyst, from about ⅗ to ⅚ part by weight of acrylonitrile in admixture with from ⅙ to about ⅖ part by weight of a previously polymerized hydroxy-containing interpolymer containing three distinct types of recurring units in the interpolymer molecules, which interpolymer was derived from the partial deacylation of the polymeric product obtained by the interpolymerization of (1) a lower alkanoate of an alkenol selected from the group consisting of isopropenyl alcohol and vinyl alcohol and (2) a mono-ethylenically unsaturated compound selected from the group consisting of ethylene, propylene, styrene, a lower alkyl maleate, vinyl cyanoethyl formal, vinyl chloride and acrylonitrile, said interpolymer being characterized by the presence of from about 3% to about 20% by weight of the interpolymer of free hydroxyl radicals derived from the interpolymerized lower alkanoate of the alkenol.

2. A process as defined by claim 1 wherein the hydroxy-containing interpolymer is derived from about 90% to about 10% of vinyl acetate and from about 10% to about 90% of ethylene, which percentages are based upon the weight of said interpolymer.

3. A process as defined by claim 1 wherein the hydroxy-containing interpolymer is derived from about 90 to about 65% of vinyl acetate and from about 10 to about 35% of vinyl chloride, which percentages are based upon the weight of said interpolymer.

4. A process as defined by claim 1 wherein the hydroxy-containing interpolymer is derived from about 70 to about 10% vinyl acetate and from about 30 to about 90% of acryonitrile, which percentages are based upon the weight of said interpolymer.

5. A process as defined by claim 1 wherein the hydroxy-containing interpolymer is derived from about 90% to about 10% of vinyl acetate and from about 10 to about 90% of vinyl cyanoethyl formal, which percentages are based upon the weight of said interpolymer.

6. A process as defined by claim 1 wherein the hydroxy-containing interpolymer is derived from about 90 to about 30% of vinyl acetate and from about 10 to about 70% of dimethyl maleate, which percentages are based upon the weight of said interpolymer.

7. A composition prepared as defined by claim 1.
8. A composition prepared as defined by claim 2.
9. A composition prepared as defined by claim 3.
10. A composition prepared as defined by claim 4.
11. A composition prepared as defined by claim 5.
12. A composition prepared as defined by claim 6.
13. A solution of a composite resinous composition as defined in claim 7 wherein the solvent is selected from the group consisting of N,N'-dimethylformamide, N,N'-dimethylacetamide, ethylene carbamate, ethylene carbonate, N-methyl-2-pyrrolidone and gamma-butyrolactone, said solution having a viscosity suitable for the formation of shaped products.

14. A fiber composed of the composition defined by claim 7.

References Cited in the file of this patent
UNITED STATES PATENTS

| | | |
|---|---|---|
| 2,341,553 | Houtz | Feb. 15, 1944 |
| 2,569,470 | Hagemeyer e al. | Oct. 2, 1951 |